US012140298B2

(12) United States Patent
Park

(10) Patent No.: US 12,140,298 B2
(45) Date of Patent: Nov. 12, 2024

(54) CABLE CLAMP APPLIED TO JUNCTION BOX OF LIGHTING FIXTURE AND JUNCTION BOX OF LIGHTING FIXTURE THEREOF

(71) Applicant: DONGGUAN L-TECH CORPORTION, Dongguan (CN)

(72) Inventor: Yong In Park, Dongguan (CN)

( * ) Notice: Subject to any disclaimer, the term of this patent is extended or adjusted under 35 U.S.C. 154(b) by 0 days.

(21) Appl. No.: 18/603,452

(22) Filed: Mar. 13, 2024

(65) Prior Publication Data

US 2024/0219016 A1 Jul. 4, 2024

(30) Foreign Application Priority Data

Feb. 26, 2024 (CN) ........................ 202410206282.4

(51) Int. Cl.
*F21V 23/06* (2006.01)
*F21V 23/00* (2015.01)

(52) U.S. Cl.
CPC ............ *F21V 23/06* (2013.01); *F21V 23/001* (2013.01)

(58) Field of Classification Search
CPC ............................... F21V 23/06; F21V 23/001
USPC ........................................................ 362/249.1
See application file for complete search history.

(56) References Cited

U.S. PATENT DOCUMENTS

2019/0086043 A1 3/2019 Wronski et al.
2019/0226669 A1 7/2019 Winters et al.
2020/0109837 A1 * 4/2020 Wenzel ............... F21V 21/0885
2023/0029890 A1 2/2023 Hack et al.

* cited by examiner

*Primary Examiner* — Elmito Breval
*Assistant Examiner* — Hana S Featherly
(74) *Attorney, Agent, or Firm* — Hemisphere Law, PLLC; Zhigang Ma

(57) ABSTRACT

The present disclosure relates to the technical field of cable fixing, in particular, to a cable clamp applied to a junction box of lighting fixture, and a junction box of lighting fixture thereof. The cable clamp includes a cable threading framework for fixing and a fastening plate mounted on the cable threading framework, wherein the fastening plate is provided with a rotating shaft part and a flip part integrally formed with the rotating shaft part; and the fastening plate is rotatably connected to the cable threading framework through the rotating shaft part. A cable can be perpendicularly threaded into the junction box through the cable clamp.

18 Claims, 7 Drawing Sheets

CABLE CLAMP APPLIED TO JUNCTION BOX OF LIGHTING FIXTURE AND JUNCTION BOX OF LIGHTING FIXTURE THEREOF

TECHNICAL FIELD

The present disclosure relates to the technical field of cable fixing, and in particular, to a cable clamp applied to a junction box of lighting fixture, and a junction box of lighting fixture thereof.

BACKGROUND

A junction box is one of electrical accessories. In indoor and outdoor decoration or construction projects, wires used are threaded through wire tubes. The junction box is usually used at a joint of wires as a transitional function for electrical connection between the wires. The function of the junction box is to configure and protect a connecting wire.

Some lighting fixtures mounted in ceilings of many buildings may be provided with junction boxes. Cables for power supplying enter the junction boxes through knock-outs arranged on the lighting fixture boxes, and are electrically connected to the wires, which are connected to lamps, inside the junction boxes. In order to facilitate mounting and removal of lighting fixtures and ensure the firmness and reliability of cable connection, a cable clamp is generally arranged at the knock-out of the junction box, such as a lateral insertion cable clamp as described in the foreign invention U.S. Pat. No. 6,498,295B1. The lateral insertion cable clamp is designed to be inserted into an opening of an electrical box (junction box) and accommodate at least two kinds of cables or wires in different sizes according to a direction of the cable clamp. The cable clamp includes a base, a first arm, and a second arm. The first arm extends from the base and includes a first fitting portion for being fitted with a first side of the opening in the electrical box. The second arm extends from the base. The arms form a channel with a first width to allow a cable or wire in a first size to be inserted between the arms when the cable clamp is oriented in a first direction and the first fitting part is aligned with the first side of the opening. The channel has a second width. The second width allows a cable or wire in a second size to be inserted between the arms when the cable clamp is oriented in a second direction and the first fitting part is aligned with a second side of the opening.

In practical applications, after the cable enters the junction box through the cable clamp, the cable is fastened by the cable clamp to fix a section of the cable that enters the junction box. When the cable is pulled or in other situations during assembling, a force acts on the position of the cable clamp, which will not apply the force on one end of the cable that enters the junction box, thereby preventing separation of a connected wire in the junction box. Some cable clamps also use a check valve structure, so that cables cannot be pulled out after being inserted into the junction box, such as a plastic cable clamp design in a steel outlet box described in the foreign invention patent No. US20,100,089640A1. However, the existing cable clamp still has certain shortcomings in the structural settings, specifically as follows: Firstly, the cable or wire needs to be threaded into the cable clamp through lateral insertion or irreversible insertion manner, so that it is hard to perpendicularly insert and pull out the cable. Secondly, the cable may undergo great sliding friction if the lateral or irreversible insertion manner is adopted, and the cable may be damaged if it is mounted and removed frequently. Furthermore, it is inconvenient for fine adjustment after the cable and the cable clamp are fixed, which may bring difficulty to control the size of wiring. Thirdly, if the lateral insertion manner is used, before a side portion of the junction box is closed, namely, when connection is performed inside the junction box, the cable is easily separated because of its high flexibility, so that it is not possible to fix the cable and then connect the cable. Particularly, if only a lamp main body is replaced, instead of replacing other components, when the side portion of the junction box is opened for reconnection, the cable is easily separated from the cable clamp.

SUMMARY

In order to overcome the drawbacks described above, the present disclosure aims to provide a technical solution capable of solving the above problems.

A cable clamp applied to a junction box of lighting fixture includes a cable threading framework for fixing and a fastening plate mounted on the cable threading framework, wherein the fastening plate is provided with a rotating shaft part and a flip part integrally formed with the rotating shaft part; the fastening plate is rotatably connected to the cable threading framework through the rotating shaft part;

the cable threading framework is provided with a clamping part; the flip part is provided with a first clamping structure matched with the clamping part; the first clamping structure and the clamping part are in clamping fit, so that the flip part is fixed on the cable threading framework in a clamping manner;

the cable threading framework is further provided with a knock-out penetrating through the cable threading framework, and the fastening plate is further formed with a fastening part capable of being rotated to the knock-out; the fastening part is rotated to the knock-out by an operation of fixing the flip part; and a structure for fastening a cable is formed between the fastening part rotated to the knock-out and the knock-out.

Preferably, the cable threading framework includes a front beam, two side beams arranged on two sides of the front beam and formed by extending backwards, and a rear beam arranged between the two side beams and located behind the front beam; the front beam, the side beams, and the rear beam are enclosed to form the knock-out; the rotating shaft part is rotatably connected between the two side beams; the fastening part is formed on the rotating shaft part; and an axial line of the fastening part is deviated from an axial line of the rotating shaft part.

Preferably, the fastening part is provided with a first protruding part; and the first protruding part is configured to resist against the rear beam to limit an opening angle of the fastening plate.

Preferably, an avoiding part configured to enlarge the opening angle of the fastening plate is arranged at an upper end of the rear beam, and the first protruding part resists against the avoiding part.

Preferably, a second protruding part is formed between the rotating shaft part and the fastening part; the second protruding part is of a cambered structure; and several wire pressing protruding parts configured to press a cable are further formed at a position between the second protruding part and the fastening part.

Preferably, a division plate for dividing the knock-out into two parts is formed on the cable threading framework; the clamping part is arranged on the division plate; there are two corresponding fastening parts which are respectively located on two sides of the flip part; the two fastening parts are formed with the rotating shaft parts; the two rotating shaft parts respectively extend out of end portions of the fastening parts; and axial lines of the fastening parts are deviated from axial lines of the rotating shaft parts.

Preferably, the first clamping structure includes a first insertion plate part perpendicular to the flip part, and a first hooking part formed at an end portion of the first insertion plate part; the clamping part includes an insertion slot part formed on the cable threading framework and a snap-in part formed on an inner side of the insertion slot part; the first insertion plate part is in abutting fit with the insertion slot part; and the first hooking part is in clamping fit with the snap-in part.

Preferably, a front end of the insertion slot part penetrates through a front end of the cable threading framework; and there are a plurality of snap-in parts which are arranged longitudinally, so that the fastening plate is able to be clamped and fixed in different angles.

Preferably, the insertion slot part upwards extends in a protruding manner through the cable threading framework, and one surface of the flip part that is abutted with the insertion slot part is provided, in an inwards sunken manner, with an accommodating slot enclosing the insertion slot part.

Preferably, a first avoiding through hole is formed in the flip part, and the first avoiding through hole directly faces the position of the first hooking part.

A junction box of lighting fixture includes the cable clamp applied to the junction box of lighting fixture described above, and further includes a box body for wire arrangement, wherein the box body is provided with a fixing part configured to fix the cable clamp; a fixing opening corresponding to the knock-out is formed in the fixing part; the cable threading framework is provided with a fixing rim abutted to the fixing opening in a surrounding manner through the knock-out; a plurality of second clamping structures are arranged on the fixing rim; and the second clamping structures are clamped on an inner wall of the box body after being inserted into the fixing opening, so that the cable clamp is fixed on the box body in a clamping manner.

Preferably, each second clamping structure includes a second insertion plate part arranged on the fixing rim and a second hooking part formed at an end portion of the second insertion plate part; and the second clamping structure is clamped on the inner wall of the box body through the second hooking part.

Preferably, a second avoiding through hole is formed in a position, directly facing the second hooking part, on the cable threading framework.

Preferably, the fixing rim is internally connected with a reinforcing edge; the reinforcing edge divides the interior of the fixing rim into two regions; and one region directly faces the rotating shaft part, and the other region is configured to allow a cable to pass.

Preferably, a protective plate that covers the knock-out is further arranged inside the fixing rim; an easy breaking point is arranged on one side of the protective plate; and the protective plate is connected to an inner side of the fixing rim through the easy breaking point.

Preferably, the fixing part is arranged at an end portion position of an upper end surface of the box body; there are two fixing parts; two cable clamps are mounted on the box body through the two fixing parts; and the fixing parts are inwards sunken, so that the cable clamps are flush with the box body.

Preferably, the box body is provided with a door-like framework and fixed panels covered at front and rear ends of the door-like framework; recesses are sunken at two corner positions of the door-like framework; the fixing parts are arranged between the recesses and the fixed panels; and pressing parts for pressing an outer side of the cable threading framework are arranged at positions, corresponding to the recesses, on the fixed panels.

A junction box of lighting fixture includes the cable clamp applied to the junction box of lighting fixture described above, and further includes a box body for wire arrangement, wherein the box body is provided with a fixing part configured to fix the cable clamp; two fixing openings corresponding to the knock-out are formed in the fixing part; the cable threading framework is provided with a fixing rim abutted to the fixing openings in a surrounding manner through the knock-out; a plurality of second clamping structures are arranged on the fixing rim; the second clamping structures are clamped on an inner wall of the box body after being inserted into the fixing openings, so that the cable clamp is fixed on the box body in a clamping manner; at least one positioning insertion hole is formed in a position, located between the two fixing openings, on the fixing part; and a positioning insertion column abutted to the positioning insertion hole is formed on the division plate.

Compared with the prior art, the present disclosure has the beneficial effects below:

According to the present disclosure, the cable clamp is divided into two parts: the cable threading framework and the fastening plate. The cable threading framework is configured to be fixedly mounted on the junction box. The cable threading framework and the fastening plate are rotatably connected. In combination with the clamping fit between the clamping part and the first clamping structure, the fastening plate can be opened and closed on the cable threading framework, and the fastening part corresponds to the knock-out of the cable threading framework. Before threading the cable through the knock-out, a user first opens the fastening plate, and then threads the cable. After the cable passes through the knock-out, the fastening plate is operated, and the fastening plate is fixed through the clamping fit between the clamping part and the first clamping structure. The fastening part is rotated into the knock-out to compress the cable, thereby achieving the operation of pressing and fixing the threaded cable.

After the cable clamp is mounted on the junction box, the cable can be perpendicularly threaded into the junction box through the cable clamp. The operation method is simple, and assembling and disassembling are convenient; furthermore, when the fastening plate is not fixed, a length of the cable extending into the junction box can be flexibly adjusted, so that the problem of an extremely high force can be avoided, and wear on the cable can also be avoided. In addition, during connection of all wires in the junction box, the cable can be in a fixed state or a movable state according to a personal habit of an operator. In a wiring process, the cable may not be separated from the cable clamp, so that a more flexible wiring mode is achieved.

The additional aspects and advantages of the present disclosure will be partially provided in the following descriptions, some of which will become apparent from the following descriptions, or learned through the practice of the present disclosure.

BRIEF DESCRIPTION OF THE DRAWINGS

To describe the technical solutions in the embodiments of the present disclosure or in the related art more clearly, the following briefly introduces the accompanying drawings for describing the embodiments or the related art. Apparently, the accompanying drawings in the following description show merely some embodiments of the present disclosure, and a person of ordinary skill in the art may still derive other drawings from the accompanying drawings without creative efforts.

Figure 1:
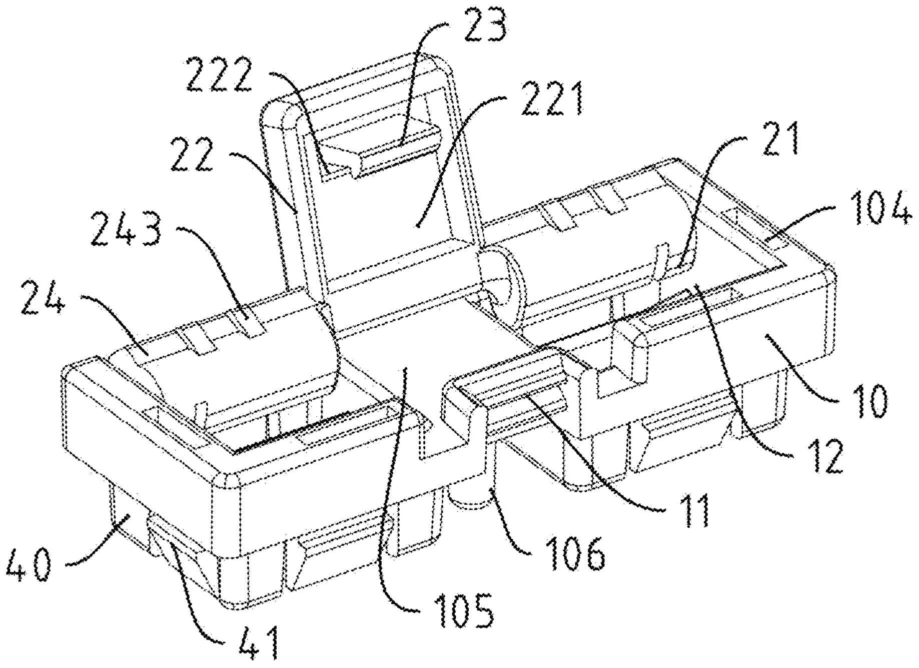
FIG. 1 is a schematic structural diagram of a cable clamp in an open state according to the present disclosure.

Reference numerals and names in the drawings are as follows:

1: cable; 10: cable threading framework; 101: front beam; 102: side beam; 103: rear beam; 104: second avoiding through hole; 105: division plate; 106: positioning insertion column; 11: clamping part; 111: insertion slot part; 112: snap-in part; 12: knock-out; 20: fastening plate; 21: rotating shaft part; 22: flip part; 221: accommodating slot; 222: first avoiding through hole; 23: first clamping structure; 231: first insertion plate part; 232: first clamping part; 24: fastening part; 241: first protruding part; 242: second protruding part; 243: wire pressing protruding part; 30: box body; 31: fixing part; 32: fixing opening; 33: door-like framework; 34: fixed panel; 35: pressing part; 36: positioning insertion hole; 40: fixing rim; 41: second clamping structure; 411: second insertion plate part; 412: second hooking part; 42: reinforcing edge; 43: protective plate; and 431: easy breaking point.

DETAILED DESCRIPTION OF THE EMBODIMENTS

The technical solutions in the embodiments of the present disclosure are clearly and completely described below. Apparently, the described embodiments are merely some embodiments of the present disclosure, rather than all of the embodiments. All other embodiments obtained by a person of ordinary skill in the art based on the embodiments of present disclosure without making creative efforts shall fall within the protection scope of present disclosure.

Embodiment 1

Referring to FIG. 1 to FIG. 4, in this embodiment of the present disclosure, a cable clamp applied to a junction box of lighting fixture is designed, including a cable threading framework 10 for fixing and a fastening plate 20 mounted on the cable threading framework 10, wherein the fastening plate 20 is provided with a rotating shaft part 21 and a flip part 22 integrally formed with the rotating shaft part; the fastening plate 20 is rotatably connected to the cable threading framework 10 through the rotating shaft part 21; the cable threading framework 10 is provided with a clamping part 11; the flip part 22 is provided with a first clamping structure 23 matched with the clamping part 11; and the first clamping structure 23 and the clamping part 11 are in clamping fit, so that the flip part 22 is fixed on the cable threading framework 10 in a clamping manner.

According to the present disclosure, the cable clamp is divided into two parts: the cable threading framework 10 and the fastening plate 20. The cable threading framework 10 is configured to be fixedly mounted on the junction box. The cable threading framework 10 and the fastening plate 20 are rotatably connected. In combination with the clamping fit between the clamping part 11 and the first clamping structure 23, the fastening plate 20 can be opened and closed on the cable threading framework 10. Based on this, the cable threading framework 10 is further provided with a knock-out 12 penetrating through the cable threading framework, and the fastening plate 20 is further formed with a fastening part 24 capable of being rotated to the knock-out 12; the fastening part 24 is rotated to the knock-out 12 by an operation of fixing the flip part 22; and a structure for fastening a cable is formed between the fastening part 24 rotated to the knock-out 12 and the knock-out 12. The fastening part 24 corresponds to the knock-out 12 of the cable threading framework 10. Before threading the cable 1 through the knock-out 12, a user first opens the fastening plate 20, and then threads the cable 1. After the cable 1 passes through the knock-out 12, the fastening plate 20 is operated, and the fastening plate 20 is fixed through the clamping fit between the clamping part 11 and the first clamping structure 23. The fastening part 24 is rotated into the knock-out 12 to compress the cable 1, thereby achieving the operation of pressing and fixing the threaded cable 1.

Through this arrangement manner, after the cable clamp is mounted on the junction box, the cable 1 can be perpendicularly threaded into the junction box through the cable clamp. The operation method is simple, and assembling and disassembling are convenient; furthermore, when the fastening plate 20 is not fixed, a length of the cable 1 extending into the junction box can be flexibly adjusted, so that the problem of an extremely high force can be avoided, and wear on the cable 1 can also be avoided. In addition, during connection of all wires in the junction box, the cable 1 can be in a fixed state or a movable state according to a personal habit of an operator. In a wiring process, the cable 1 may not be separated from the cable clamp, so that a more flexible wiring mode is achieved.

Figure 3:
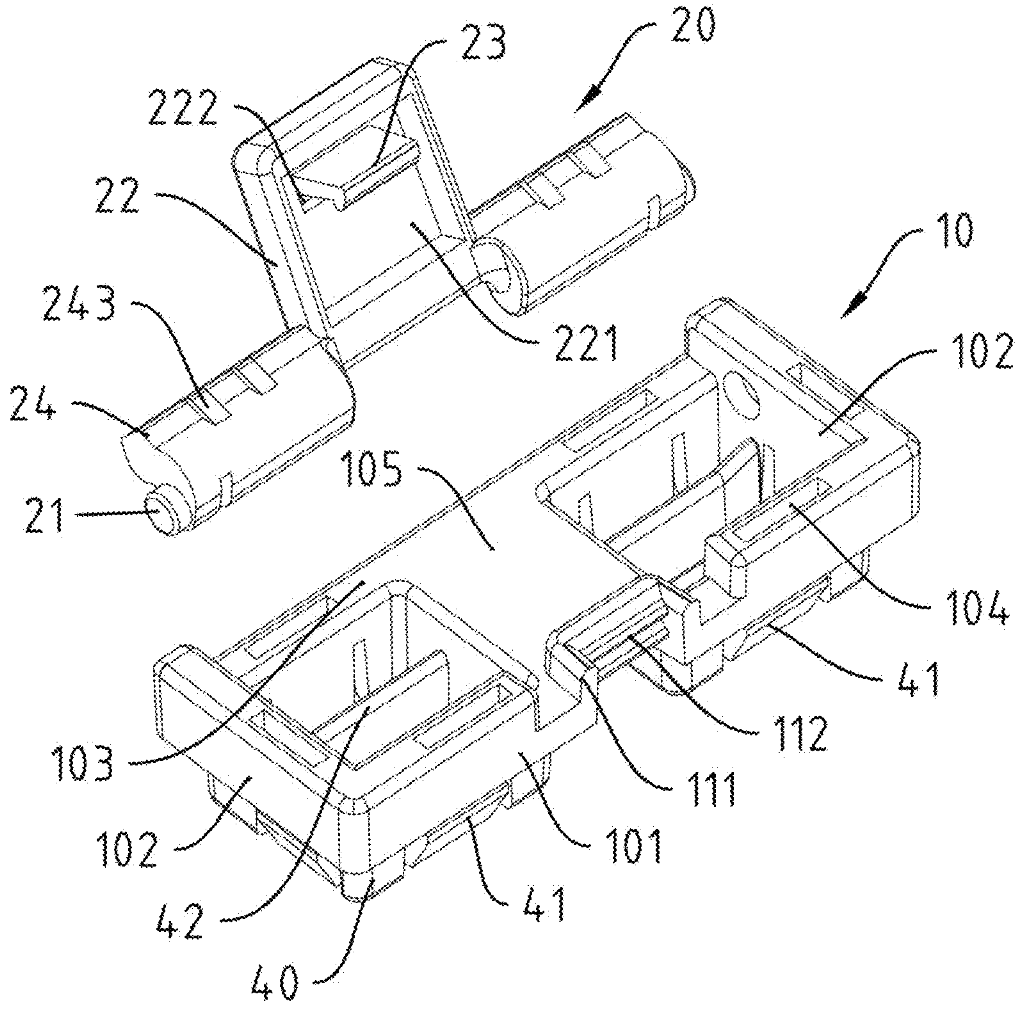
FIG. 3 is a schematic structural diagram of a cable clamp in a divided state according to the present disclosure.
Figure 4:
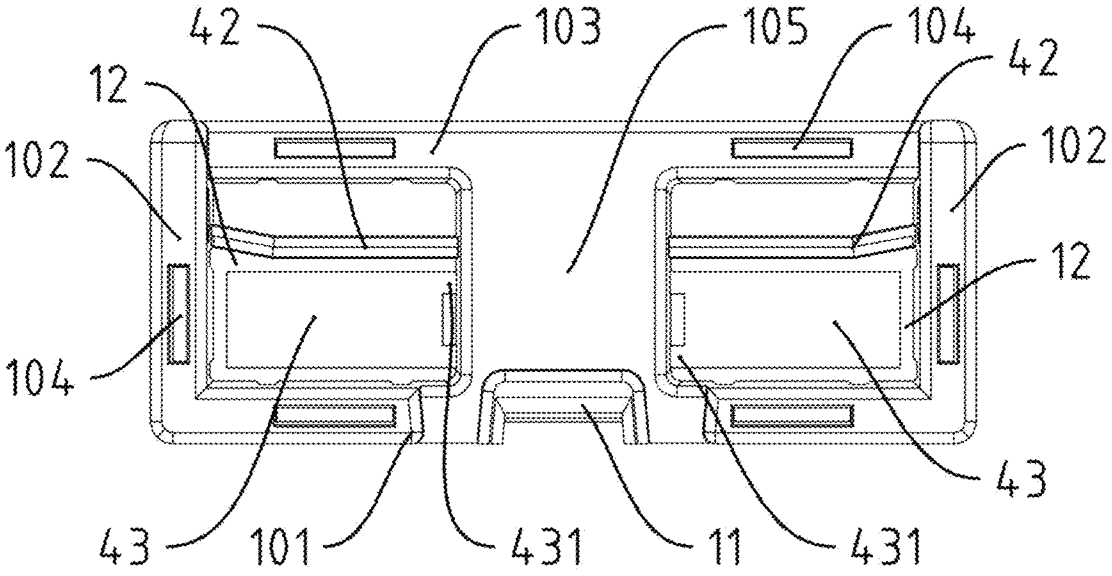
FIG. 4 is a schematic structural diagram of a cable threading framework according to the present disclosure.

Referring to FIG. 3 to FIG. 4, according to the structural design of the cable threading framework 10 and the fastening plate 20 in this embodiment, the cable threading framework 10 includes a front beam 101, two side beams 102 arranged on two sides of the front beam 101 and formed by extending backwards, and a rear beam 103 arranged between the two side beams 102 and located behind the front beam 101; the front beam 101, the side beams 102, and the rear beam 103 are enclosed to form the knock-out 12; the rotating shaft part 21 is rotatably connected between the two side beams 102, and the rotating shaft part 21 is close to the rear beam 103, so that a distance between the rotating shaft part 21 and the front beam 101 is used as the knock-out 12 for threading the cable 1; the fastening part 24 is formed on the rotating shaft part 21; and an axial line of the fastening part 24 is deviated from an axial line of the rotating shaft part 21. By use of the method for deviating from the axial line, when the fastening plate 20 rotates through the rotating shaft part 21, the fastening plate 24 can be close to or away from the knock-out 12 to achieve wire releasing and pressing operations.

Figure 2:
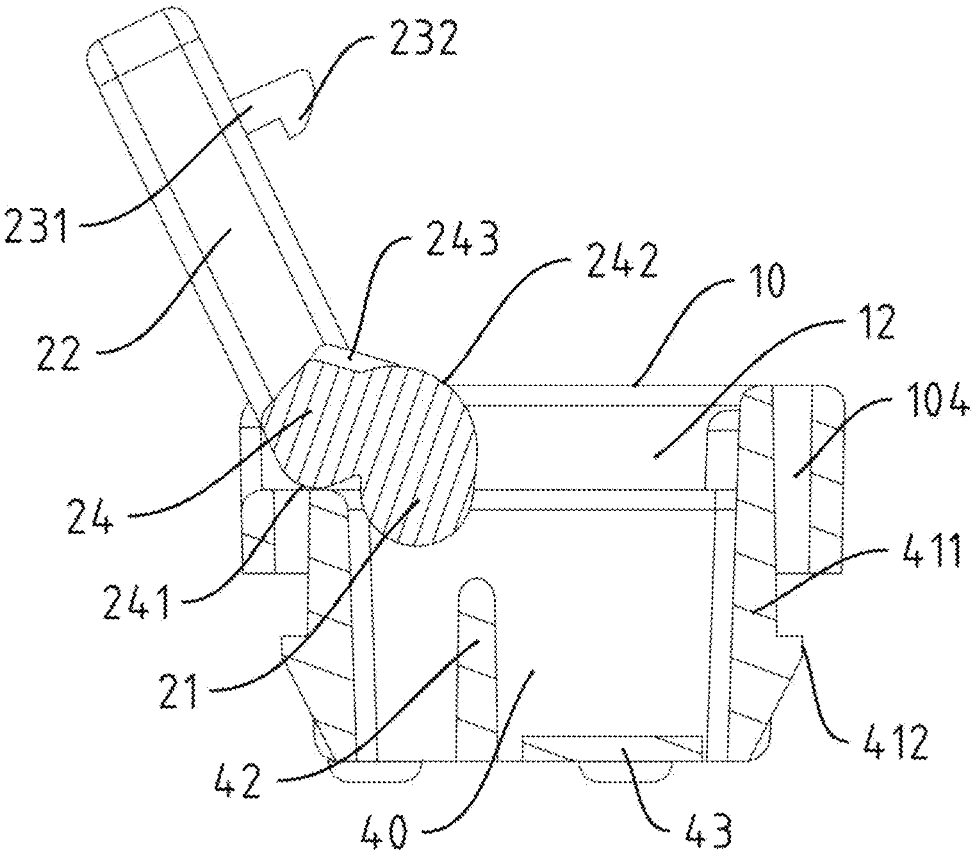
FIG. 2 is a schematic diagram of a cross-sectional structure of FIG. 1 according to the present disclosure.

Referring to FIG. 2, in this embodiment, the fastening part 24 is provided with a first protruding part 241; the first protruding part 241 is configured to resist against the rear beam 103 to limit an opening angle of the fastening plate 20; an avoiding part configured to enlarge the opening angle of the fastening plate 20 is arranged at an upper end of the rear beam 103, and the first protruding part 241 resists against the avoiding part. The fastening plate 20 can rotate within an obtuse range. The entire structural compactness is more reliable. After the fastening plate 20 is fixed through the fit between the first clamping structure 23 and the clamping part 11, the entire structure is cubic, so that there will be no excess protruding structures to cause conflicts to some narrow building mounting spaces.

Referring to FIG. 2, in this embodiment, a second protruding part 242 is formed between the rotating shaft part 21 and the fastening part 24; the second protruding part 242 is of a cambered structure; and several wire pressing protruding parts 243 configured to press a cable are further formed at a position between the second protruding part 242 and the fastening part 24. The second protruding part 242 achieves a transition effect, which can uniformly push the threaded cable 1 to the front beam 101 of the cable threading framework 10, and the cable is finally compressed and fixed by the wire pressing protruding part 243.

Referring to FIG. 1 to FIG. 6, based on the above embodiment, a junction box of lighting fixture is designed. The cable clamp is applied to the junction box of lighting fixture, so that use of the cable clamp will be explained in more details. The junction box of lighting fixture includes the above-mentioned cable clamp applied to the junction box of lighting fixture, and further includes a box body 30 for wire arrangement; the box body 30 is provided with a fixing part 31 configured to fix the cable clamp; a fixing opening 32 corresponding to the knock-out 12 is formed in the fixing part 31; the cable threading framework 10 is provided with a fixing rim 40 abutted to the fixing opening 32 in a surrounding manner through the knock-out 12; a plurality of second clamping structures 41 are arranged on the fixing rim 40; and the second clamping structures 41 are clamped on an inner wall of the box body 30 after being inserted into the fixing opening 32, so that the cable clamp is fixed on the box body 30 in a clamping manner. The cable clamp is positioned through the fit between the fixing rim 40 and the fixing opening 32. Based on this, the purpose of fixing the cable clamp is achieved by clamping the second clamping structures 41 to the inner side of the junction box. The plurality of second clamping structures 41 are arranged around the fixing rim 40, which ensures that the cable threading framework 10 can be firmly fixed at the fixing opening 32 of the junction box after the clamping. Each second clamping structure 41 includes a second insertion plate part 411 arranged on the fixing rim 40 and a second hooking part 412 formed at an end portion of the second insertion plate part 411; and the second clamping structure 41 is clamped on the inner wall of the box body 30 through the second hooking part 412. The structural design is simple and the clamping is firm and reliable. Furthermore, a second avoiding through hole 104 is formed in a position, directly facing the second hooking part 412, on the cable threading framework 10. It is not necessary to design a row position or a pent roof for a mold that forms the second hooking part 412, thus reducing the manufacturing cost to a certain extent.

Referring to FIG. 4, in this embodiment, the fixing rim 40 is internally connected with a reinforcing edge 42; the reinforcing edge 42 divides the interior of the fixing rim 40 into two regions; and one region directly faces the rotating shaft part 21, and the other region is configured to allow a cable to pass. A reinforcing effect is achieved on the fixing rim 40, and a certain guide effect is also achieved on the insertion of the cable 1. A protective plate 43 that covers the knock-out 12 is further arranged inside the fixing rim 40; an easy breaking point 431 is arranged on one side of the protective plate 43; and the protective plate 43 is connected to an inner side of the fixing rim 40 through the easy breaking point 431. When it is necessary to use the corresponding knock-out 12, the protective plate 43 can be used after being forced apart through the easy breaking point 431. The knock-out 12 that is not used can protect the protective plate 43 to prevent excess dust or large particulate matters from entering the junction box.

Figure 5:
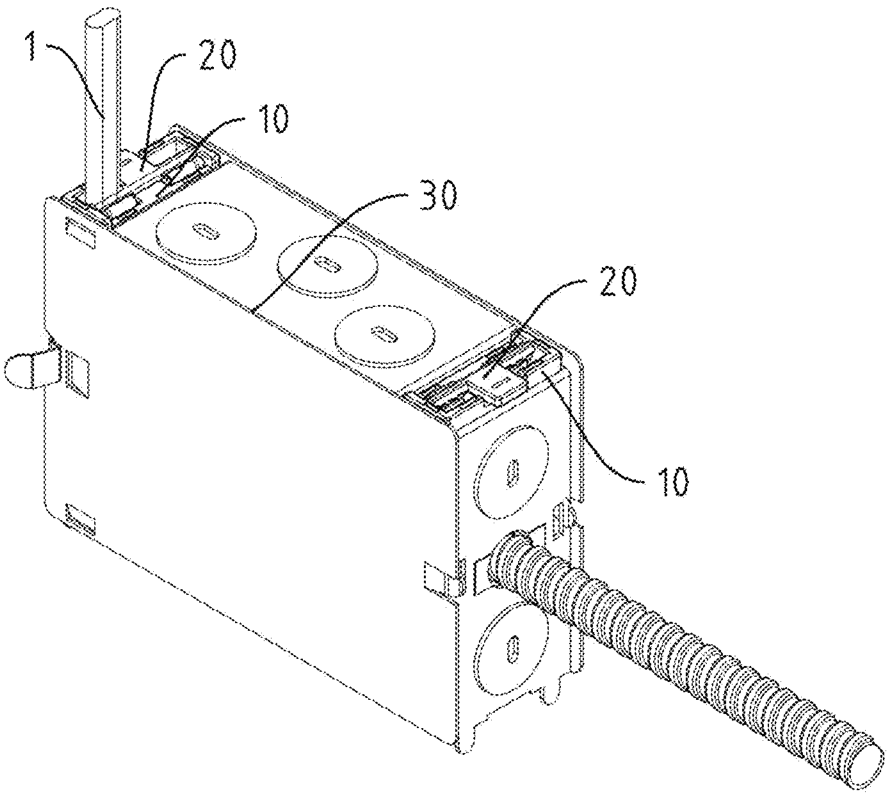
FIG. 5 is a schematic structural diagram of a junction box in the present disclosure.
Figure 6:
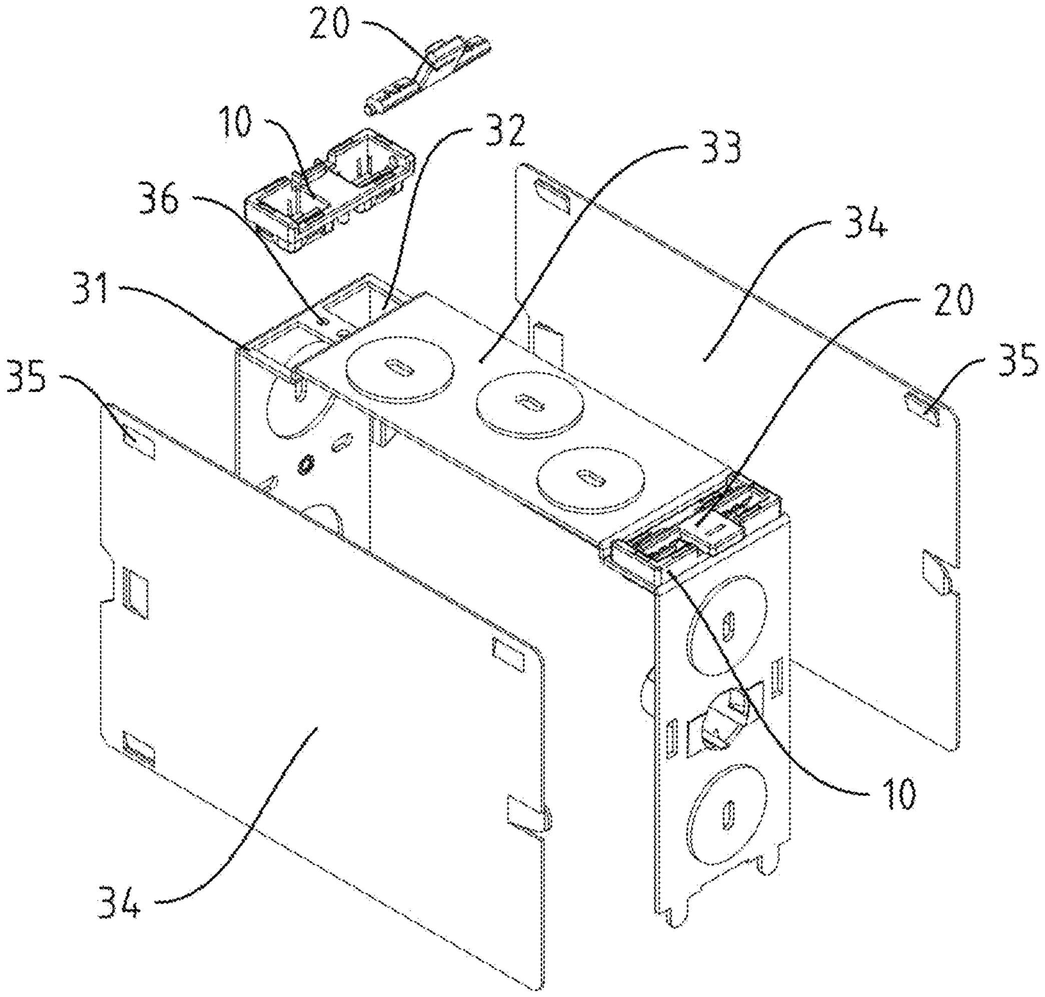
FIG. 6 is a schematic diagram of a split structure of a junction box according to the present disclosure.

Referring to FIG. 5 to FIG. 6, in this embodiment, according to the structural design of the junction box, the fixing part 31 is arranged at an end portion position of an upper end surface of the box body 30; there are two fixing parts 31; two cable clamps are mounted on the box body 30 through the two fixing parts 31; and the fixing parts 31 are inwards sunken, so that the cable clamps are flush with the box body 30, making the overall structure high in symmetric consistency. Furthermore, the cable clamps will not protrude out of the junction box, so that in some narrow spaces, reasonable placement of the junction box is ensured, and the problem of failure in mounting caused by a limited space because of the design of the cable clamps is avoided. Specifically, the box body 30 is provided with a door-like framework 33 and fixed panels 34 covered at front and rear ends of the door-like framework 33. According to a requirement for wiring in the junction box, a deatchable structure is generally arranged between the door-like framework 33 and the fixed panels 34. Recesses are sunken at two corner positions of the door-like framework 33; the fixing parts 31 are arranged between the recesses and the fixed panels 34; and pressing parts 35 for pressing an outer side of the cable threading framework 10 are arranged at positions, corresponding to the recesses, on the fixed panels 34.

Embodiment 2

Referring to FIG. 1 to FIG. 4, based on Embodiment 1 described above, in this embodiment of the present disclosure, according to a design requirement for the structural compactness of the cable clamp, the number of cable threading holes on the single cable clamp is optimized. A symmetric structural design is used. A division plate 105 for dividing the knock-out 12 into two parts is formed on the cable threading framework 10; the clamping part 11 is arranged on the division plate 105; there are two corresponding fastening parts 24 which are respectively located on two sides of the flip part 22; the two fastening parts 24 are formed with the rotating shaft parts 21; the two rotating shaft parts 21 respectively extend out of end portions of the fastening parts 24; and axial lines of the fastening parts 24 are deviated from axial lines of the rotating shaft parts 21. Through this setting, two knock-outs 12 can be formed in each cable clamp. If there are multiple cables 1, the two knock-outs 12 are used. If there are a few of cables 1, only one knock-out 12 is used. Different numbers of cables 1 can be connected flexibly. Furthermore, due to the adoption of the symmetric structural design, the cable clamp is ingenious and compact in overall structural design and has a widespread application.

Referring to FIG. 1 to FIG. 4, in this embodiment, the first clamping structure 23 includes a first insertion plate part 231 perpendicular to the flip part 22, and a first hooking part 232 formed at an end portion of the first insertion plate part 231; the clamping part 11 includes an insertion slot part 111 formed on the cable threading framework 10 and a snap-in part 112 formed on an inner side of the insertion slot part 111; the first insertion plate part 231 is in abutting fit with the insertion slot part 111; and the first hooking part 232 is in clamping fit with the snap-in part 112. The flip part 22 and the cable threading framework 10 are in guiding and positioning fit by using the insertion slot part 111 and the first insertion plate part 231, so that the first hooking part 232 and the snap-in part 112 are abutted more accurately, without deviation or looseness, thus ensuring the firm reliability of the clamping fit between the first clamping structure 23 and the clamping part 11.

Figure 7:
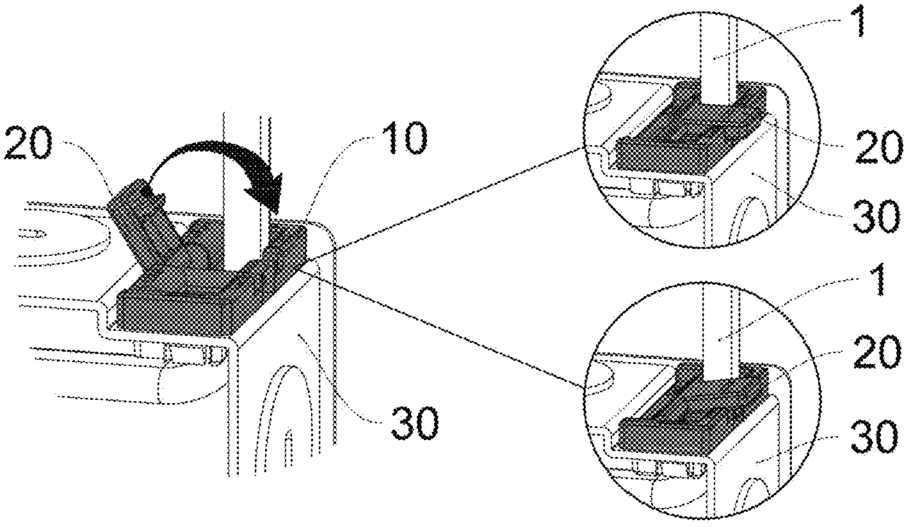
FIG. 7 is a schematic diagram of connecting a cable with different thicknesses according to the present disclosure.

Referring to FIG. 3 and FIG. 7, considering that the cables 1 have different thicknesses, in this embodiment, a front end of the insertion slot part 111 further penetrates through a front end of the cable threading framework 10, so that the insertion plate part will not be pressed during the insertion. There are a plurality of snap-in parts 112 which are arranged longitudinally, so that the fastening plate 20 can be clamped and fixed in different angles. When the cable 1 is thick, the first hooking part 232 is clamped at the snap-in part 112 at the upper part. When the cable 1 is thin, the first hooking part 232 is clamped at the snap-in part 112 at the lower part. The position where the fastening part 24 enters the knock-out 12 can be controlled, thus controlling a distance between the fastening part 24 and the front beam 10 to ensure that all the cables 1 having the different thicknesses can undergo a reasonable force applied by the fastening part 24.

Referring to FIG. 1 and FIG. 3, to satisfy a setting of a plurality of fastening positions, the insertion slot part 111 upwards extends in a protruding manner through the cable threading framework 10, so that an inner wall of the insertion slot part 111 has an enough height to arrange the plurality of snap-in parts 112. Furthermore, one surface of the flip part 22 that is abutted with the insertion slot part 111 is provided, in an inwards sunken manner, with an accommodating slot 221 enclosing the insertion slot part 111, so that the entire insertion slot part is more reliable in fitting stability. If the cable clamp is provided with two knock-outs 12, but only one knock-out 12 is used, the fit between the accommodating slot 221 and the insertion slot part 111 and the fit between the insertion slot part 111 and the first insertion plate par 231 can prevent the fastening plate 20 from skewing towards one side and prevent the rotating shaft part 21 from being separated from the cable threading framework 10. In addition, a first avoiding through hole 222 is formed in the flip part 22, and the first avoiding through hole 222 directly faces the position of the first hooking part 232. Through this setting, a mold can be simplified, so that it is not necessary to design a row position or a pent roof for a mold that forms the first hooking part 232, thus reducing the manufacturing cost to a certain extent.

Referring to FIG. 1 to FIG. 6, based on the above embodiment, a junction box of lighting fixture is designed. The cable clamp with the two knock-outs 12 is applied to the junction box of lighting fixture, so as to explain the use of the cable clamp in more details. The junction box of lighting fixture includes the above-mentioned cable clamp applied to the junction box of lighting fixture, and further includes a box body 30 for wire arrangement; the box body 30 is provided with a fixing part 31 configured to fix the cable clamp; two fixing openings 32 corresponding to the knock-outs 12 are formed in the fixing part 31; the cable threading framework 10 is provided with a fixing rim 40 abutted to the fixing openings 32 in a surrounding manner through the knock-outs 12; a plurality of second clamping structures 41 are arranged on the fixing rim 40; the second clamping structures 41 are clamped on an inner wall of the box body 30 after being inserted into the fixing openings 32, so that the cable clamp is fixed on the box body 30 in a clamping manner; at least one positioning insertion hole 36 is formed in a position, located between the two fixing openings 32, on the fixing part 31; and a positioning insertion column 106 abutted to the positioning insertion hole 36 is formed on the division plate 105. By the arrangement of the positioning insertion column 106, the firm reliability of mounting the cable clamp on the junction box is further improved.

For those skilled in the art, it is apparent that the present disclosure is not limited to the details of the exemplary embodiments mentioned above, and can be implemented in other specific forms without departing from the spirit or basic features of the present disclosure. Therefore, in any perspective, the embodiments should be regarded as exemplary and non-restrictive. The scope of the present disclosure is limited by the accompanying claims rather than the above description. Therefore, all changes within the meaning and scope of the equivalent conditions of the claims within the present disclosure.

What is claimed is:

1. A cable clamp applied to a junction box of lighting fixture, comprising a cable threading framework for fixing and a fastening plate mounted on the cable threading framework, wherein the fastening plate is provided with a rotating shaft part and a flip part integrally formed with the rotating shaft part; the fastening plate is rotatably connected to the cable threading framework through the rotating shaft part; the cable threading framework is provided with a clamping part; the flip part is provided with a first clamping structure matched with the clamping part; the first clamping structure and the clamping part are in clamping fit, so that the flip part is fixed on the cable threading framework in a clamping manner; the cable threading framework is further provided with a knock-out penetrating through the cable threading framework, and the fastening plate is further formed with a fastening part capable of being rotated to the knock-out; the fastening part is rotated to the knock-out by an operation of fixing the flip part; a structure for fastening a cable is formed between the fastening part rotated to the knock-out and the knock-out, and wherein a division plate for dividing the knock-out into two parts is formed on the cable threading framework; the clamping part is arranged on the division plate; there are two corresponding fastening parts which are respectively located on two sides of the flip part; the two fastening parts are formed with the rotating shaft parts.

2. The cable clamp applied to the junction box of lighting fixture according to claim 1, wherein the cable threading framework comprises a front beam, two side beams arranged on two sides of the front beam and formed by extending backwards, and a rear beam arranged between the two side beams and located behind the front beam; the front beam, the side beams, and the rear beam are enclosed to form the knock-out; the rotating shaft part is rotatably connected between the two side beams; the fastening part is formed on the rotating shaft part; and an axial line of the fastening part is deviated from an axial line of the rotating shaft part.

3. The cable clamp applied to the junction box of lighting fixture according to claim 2, wherein the fastening part is provided with a first protruding part; and the first protruding part is configured to resist against the rear beam to limit an opening angle of the fastening plate.

4. The cable clamp applied to the junction box of lighting fixture according to claim 3, wherein an avoiding part configured to enlarge the opening angle of the fastening plate is arranged at an upper end of the rear beam, and the first protruding part resists against the avoiding part.

5. The cable clamp applied to the junction box of lighting fixture according to claim 2, wherein a second protruding part is formed between the rotating shaft part and the fastening part; the second protruding part is of a cambered structure; and several wire pressing protruding parts configured to press a cable are further formed at a position between the second protruding part and the fastening part.

6. The cable clamp applied to the junction box of lighting fixture according to claim 1, wherein the two rotating shaft parts respectively extend out of end portions of the fastening parts; and axial lines of the fastening parts are deviated from axial lines of the rotating shaft parts.

7. A junction box of lighting fixture, comprising the cable clamp applied to the junction box of lighting fixture according to claim 6, and further comprising a box body for wire arrangement, wherein the box body is provided with a fixing part configured to fix the cable clamp; two fixing openings corresponding to the knock-out are formed in the fixing part; the cable threading framework is provided with a fixing rim abutted to the fixing openings in a surrounding manner through the knock-out; a plurality of second clamping structures are arranged on the fixing rim; the second clamping structures are clamped on an inner wall of the box body after being inserted into the fixing openings, so that the cable clamp is fixed on the box body in a clamping manner; at least one positioning insertion hole is formed in a position, located between the two fixing openings, on the fixing part; and a positioning insertion column abutted to the positioning insertion hole is formed on the division plate.

8. The cable clamp applied to the junction box of lighting fixture according to claim 1, wherein the first clamping structure comprises a first insertion plate part perpendicular to the flip part, and a first hooking part formed at an end portion of the first insertion plate part; the clamping part comprises an insertion slot part formed on the cable threading framework and a snap-in part formed on an inner side of the insertion slot part; the first insertion plate part is in abutting fit with the insertion slot part; and the first hooking part is in clamping fit with the snap-in part.

9. The cable clamp applied to the junction box of lighting fixture according to claim 7, wherein a front end of the insertion slot part penetrates through a front end of the cable threading framework; and there are a plurality of snap-in parts which are arranged longitudinally, so that the fastening plate is able to be clamped and fixed in different angles.

10. The cable clamp applied to the junction box of lighting fixture according to claim 9, wherein the insertion slot part upwards extends in a protruding manner through the cable threading framework, and one surface of the flip part that is abutted with the insertion slot part is provided, in an inwards sunken manner, with an accommodating slot enclosing the insertion slot part.

11. The cable clamp applied to the junction box of lighting fixture according to claim 8, wherein a first avoiding through hole is formed in the flip part, and the first avoiding through hole directly faces the position of the first hooking part.

12. A junction box of lighting fixture, comprising the cable clamp applied to the junction box of lighting fixture according to claim 1, and further comprising a box body for wire arrangement, wherein the box body is provided with a fixing part configured to fix the cable clamp; a fixing opening corresponding to the knock-out is formed in the fixing part; the cable threading framework is provided with a fixing rim abutted to the fixing opening in a surrounding manner through the knock-out; a plurality of second clamping structures are arranged on the fixing rim; and the second clamping structures are clamped on an inner wall of the box body after being inserted into the fixing opening, so that the cable clamp is fixed on the box body in a clamping manner.

13. The junction box of lighting fixture according to claim 12, wherein each second clamping structure comprises a second insertion plate part arranged on the fixing rim and a second hooking part formed at an end portion of the second insertion plate part; and the second clamping structure is clamped on the inner wall of the box body through the second hooking part.

14. The junction box of lighting fixture according to claim 13, wherein a second avoiding through hole is formed in a position, directly facing the second hooking part, on the cable threading framework.

15. The junction box of lighting fixture according to claim 12, wherein the fixing rim is internally connected with a reinforcing edge; the reinforcing edge divides the interior of the fixing rim into two regions; and one region directly faces the rotating shaft part, and the other region is configured to allow a cable to pass.

16. The junction box of lighting fixture according to claim 12, wherein a protective plate that covers the knock-out is further arranged inside the fixing rim; an easy breaking point is arranged on one side of the protective plate; and the protective plate is connected to an inner side of the fixing rim through the easy breaking point.

17. The junction box of lighting fixture according to claim 12, wherein the fixing part is arranged at an end portion position of an upper end surface of the box body; there are two fixing parts; two cable clamps are mounted on the box body through the two fixing parts; and the fixing parts are inwards sunken, so that the cable clamps are flush with the box body.

18. The junction box of lighting fixture according to claim 17, wherein the box body is provided with a door-like framework and fixed panels covered at front and rear ends of the door-like framework; recesses are sunken at two corner positions of the door-like framework; the fixing parts are arranged between the recesses and the fixed panels; and pressing parts for pressing an outer side of the cable threading framework are arranged at positions, corresponding to the recesses, on the fixed panels.

* * * * *